US012699421B2

(12) United States Patent
Mao et al.

(10) Patent No.: US 12,699,421 B2
(45) Date of Patent: Aug. 4, 2026

(54) MEMORY EXPANSION DEVICE

(71) Applicant: FULLINK TECHNOLOGY CO., LTD., Shenzhen (CN)

(72) Inventors: Danyun Mao, Shenzhen (CN); Jiajun Yang, Shenzhen (CN); Xingquan Chen, Shenzhen (CN); Jie Xiao, Shenzhen (CN)

(73) Assignee: FULLINK TECHNOLOGY CO., LTD., Shenzhen (CN)

( * ) Notice: Subject to any disclaimer, the term of this patent is extended or adjusted under 35 U.S.C. 154(b) by 66 days.

(21) Appl. No.: 18/852,678

(22) PCT Filed: Jul. 5, 2022

(86) PCT No.: PCT/CN2022/103933
§ 371 (c)(1),
(2) Date: Sep. 30, 2024

(87) PCT Pub. No.: WO2024/007154
PCT Pub. Date: Jan. 11, 2024

(65) Prior Publication Data
US 2025/0231600 A1    Jul. 17, 2025

(51) Int. Cl.
*G06F 1/16* (2006.01)
*G06F 1/20* (2006.01)

(52) U.S. Cl.
CPC .......... *G06F 1/1632* (2013.01); *G06F 1/1656* (2013.01); *G06F 1/203* (2013.01)

(58) Field of Classification Search
CPC ........ G06F 1/1632; G06F 1/203; G06F 1/185; G06F 1/1656
See application file for complete search history.

(56) References Cited

U.S. PATENT DOCUMENTS 5,768,101 A      6/1998  Cheng
9,395,773 B1 *  7/2016  Huang ..................... G06F 1/203
(Continued)

FOREIGN PATENT DOCUMENTS

CN        102280126 B      11/2015
CN        210627026 U       5/2020
(Continued)

OTHER PUBLICATIONS

European Patent Application No. 22949742.5: Extended European Search Report, Mar. 24, 2026 (9 pages).
(Continued)

*Primary Examiner* — Nidhi Thaker
(74) *Attorney, Agent, or Firm* — Greer, Burns & Crain, Ltd

(57) ABSTRACT

A memory expansion device is provided and includes a shell and a memory expansion component. A contact surface, a heat dissipation surface and a heat conduction port are disposed on the shell. An accommodating cavity is arranged inside the shell. The heat conduction port penetrates through the contact surface and the heat dissipation surface and is separated from the accommodating cavity. The memory expansion component is arranged within the accommodating cavity. When the contact surface of the shell is in contact with an outer surface of the computer host, some heat dissipation holes on the bottom of the computer host correspondingly communicate with the heat conduction port on the shell, so that heat on the computer host can be dissipated to a side where the heat dissipation surface is located through the heat conduction port.

20 Claims, 3 Drawing Sheets

(56)　　　　　References Cited

U.S. PATENT DOCUMENTS

| | | | |
|---|---|---|---|
| 9,992,912 | B1 | 6/2018 | Wang |
| 10,929,327 | B1 * | 2/2021 | Schrempp ........... G06F 13/4068 |
| 11,914,427 | B2 * | 2/2024 | Hyun ........................ G06F 1/20 |
| 12,436,567 | B1 * | 10/2025 | Guclu ..................... G06F 1/181 |
| 12,513,377 | B2 * | 12/2025 | Lv .......................... H04N 23/51 |
| 2006/0061964 | A1 | 3/2006 | Cheng |
| 2013/0044429 | A1 * | 2/2013 | Knopf ..................... G06F 1/182 |
| | | | 361/692 |
| 2019/0227605 | A1 | 7/2019 | Wiltzius et al. |
| 2025/0355465 | A1 * | 11/2025 | Hsu ....................... G06F 1/1632 |

FOREIGN PATENT DOCUMENTS

| | | | |
|---|---|---|---|
| CN | 211607154 | U | 9/2020 |
| CN | 112074112 | A | 12/2020 |
| CN | 212341791 | U | 1/2021 |
| CN | 215181753 | U | 12/2021 |
| CN | 216449990 | U | 5/2022 |

OTHER PUBLICATIONS

Chinese Patent Application No. 202280002122.7: English translation of Office Action, May 27, 2026 (20 pages).
Chen, "Satechi Apple Mac Mini Type-C Stand & Hub with SSD Enclosure review," The Gadgeteer, Jul. 18, 2021 (6 pages).

* cited by examiner

MEMORY EXPANSION DEVICE

CROSS-REFERENCE TO THE RELATED APPLICATIONS

This application is the national phase entry of International Application No. PCT/CN2022/103933, filed on Jul. 5, 2022, the content of which is incorporated herein by reference in its entirety.

TECHNICAL FIELD

The present application relates to the field of computer technology, more particularly to a memory expansion device.

BACKGROUND

With the development of microelectronics technology and industrial informatization, computers are increasingly used in various fields. The computer, commonly known as the computer, is an electronic computing machine used for high-speed computing, which can perform numerical calculation and logical calculation, and also has storage and memory functions.

At present, with the rapid development of computers, existing computer systems have higher and higher requirements for storage capacity. In the process of using computers, insufficient memory capacity may occur, and memory capacity expansion is required to meet the business needs of data centers, so memory expansion docks are born.

SUMMARY

Objectives of the embodiments of the present application include but not limited to solving the technical problem that the memory expansion dock in existing technologies will cover some heat dissipation holes on a computer host when the memory expansion dock is in contact with the computer host which affects the heat dissipation of the computer host.

Technical solutions adopted in the embodiments of the present application are as follows:

A memory expansion device is provided, which includes: a shell and a memory expansion component.

A contact surface, a heat dissipation surface and a heat conduction port are disposed on the shell, and an accommodating cavity is arranged inside the shell, the heat conduction port penetrates through the contact surface and the heat dissipation surface, and is separated from the accommodating cavity.

The memory expansion component is arranged within the accommodating cavity.

In one embodiment, the contact surface is arranged opposite to the heat dissipation surface, and a plurality of air inlets and a plurality of air outlets are also disposed on the shell, the air inlets and the air outlets are all in communication with the accommodating cavity and are located on a side where the heat dissipation surface is located.

In one embodiment, a circumferential area of the heat dissipation surface corresponding to the heat conduction port is recessed toward the contact surface to form a guide groove, and the circumferential area of the heat dissipation surface corresponding to the air inlets and the air outlets is inclined toward the guide groove.

In one embodiment, the memory expansion device also includes a plurality of anti-skid feet, and the plurality of anti-skid feet are arranged at intervals on the heat dissipation surface.

In one embodiment, the contact surface includes a middle area, a transition area and an edge area, the transition area is arranged surrounding a periphery of the middle area, the edge area is arranged surrounding a periphery of the transition area, the accommodating cavity is arranged corresponding to the middle area, and the heat conduction port is arranged corresponding to the transition area. A wiring cavity is arranged inside the shell, the wiring cavity is arranged corresponding to the edge area, and is in communication with the accommodating cavity.

In one embodiment, the middle area is recessed relative to the edge area to form a placement groove.

In one embodiment, the transition area is inclined relative to the edge area, and the transition area is oriented toward a center of the middle area.

In one embodiment, the shell includes a front shell and a bottom shell, the bottom shell and the front shell are fit-connected to form the accommodating cavity and the wiring cavity, a side of the front shell facing away from the bottom shell is the contact surface, a side of the bottom shell facing away from the front shell is the heat dissipation surface, and the heat conduction port runs through the front shell and the bottom shell.

In one embodiment, a slot is disposed on one of the front shell and the bottom shell, and a buckle is disposed on the other one of the front shell and the bottom shell, the buckle and the slot are both arranged corresponding to the transition area, and the buckle is engaged with the slot.

In one embodiment, the front shell is an aluminum shell, and the bottom shell is a plastic shell.

In one embodiment, the memory expansion component is arranged close to the heat dissipation surface.

In one embodiment, the memory expansion component includes a circuit board and an expansion card, and the expansion card is detachably arranged on the circuit board.

In one embodiment, a card seat and an elastic limit column are disposed on the circuit board, the card seat and the elastic limit column are arranged opposite to each other and spaced apart, and the expansion card is arranged between the card seat and the elastic limit column.

In one embodiment, the elastic limit column is a silica gel particle.

In one embodiment, an installation port is disposed on the shell in communication with the accommodating cavity, and the installation port is located on the side where the heat dissipation surface is located; the memory expansion device also includes a cover plate covering the installation port; the expansion card is arranged corresponding to the installation port.

In one embodiment, a plurality of heat dissipation fins are arranged on a side of the cover plate away from the accommodating cavity.

In one embodiment, the memory expansion device also includes an indicator light component. The indicator light component is disposed on the shell and electrically connected to the circuit board, and is configured to indicate an operating state of the expansion card.

In one embodiment, a first color light is displayed by the indicator light component when the expansion card is not operating; a second color light is displayed by the indicator light component when the expansion card is not assembled on the circuit board; and a third color light is displayed by the indicator light component when the expansion card is normally connected and operable. The first color light, the second color light and the third color light are lights of different colors respectively.

In one embodiment, the memory expansion device also includes a data transmission line, one end of the data transmission line is electrically connected to the memory expansion component, and another end of the data transmission line is arranged passing through an outer peripheral side wall of the shell and extending out of the shell.

In one embodiment, two data transmission lines are provided, and the two data transmission lines are arranged in parallel.

Beneficial effects of the memory expansion device provided in the embodiment of the present application include that: the memory expansion device of the present application includes a shell and a memory expansion component, and the memory expansion component is configured to store programs and various data to expand the memory of the computer host. The heat conduction provided penetrates through the contact surface and the heat dissipation surface on the shell, when the contact surface of the shell is in contact with the outer surface of the computer host, some heat dissipation holes on the bottom of the computer host are correspondingly in communication with the heat conduction port on the shell, so that heat on the computer host can be dissipated to the side where the heat dissipation surface is located through the heat conduction port, so that the heat on the computer host can be dissipated in time, which is conducive to ensuring the heat dissipation performance of the computer host. In addition, the heat conduction port is separated from the accommodating cavity, which effectively prevents the heat dissipated by the computer from entering the accommodating cavity through the heat conduction port and damaging the memory expansion component.

BRIEF DESCRIPTION OF THE DRAWINGS

In order to illustrate solutions in the embodiments of the present application more clearly, the following will briefly introduce the drawings that need to be used in description of the embodiments. Obviously, the drawings in the following description are merely some embodiments of the present application. For a person of ordinary skill in the art, other drawings may also be obtained according to these drawings without exerting creative efforts.

DETAILED DESCRIPTION

Figure 1:
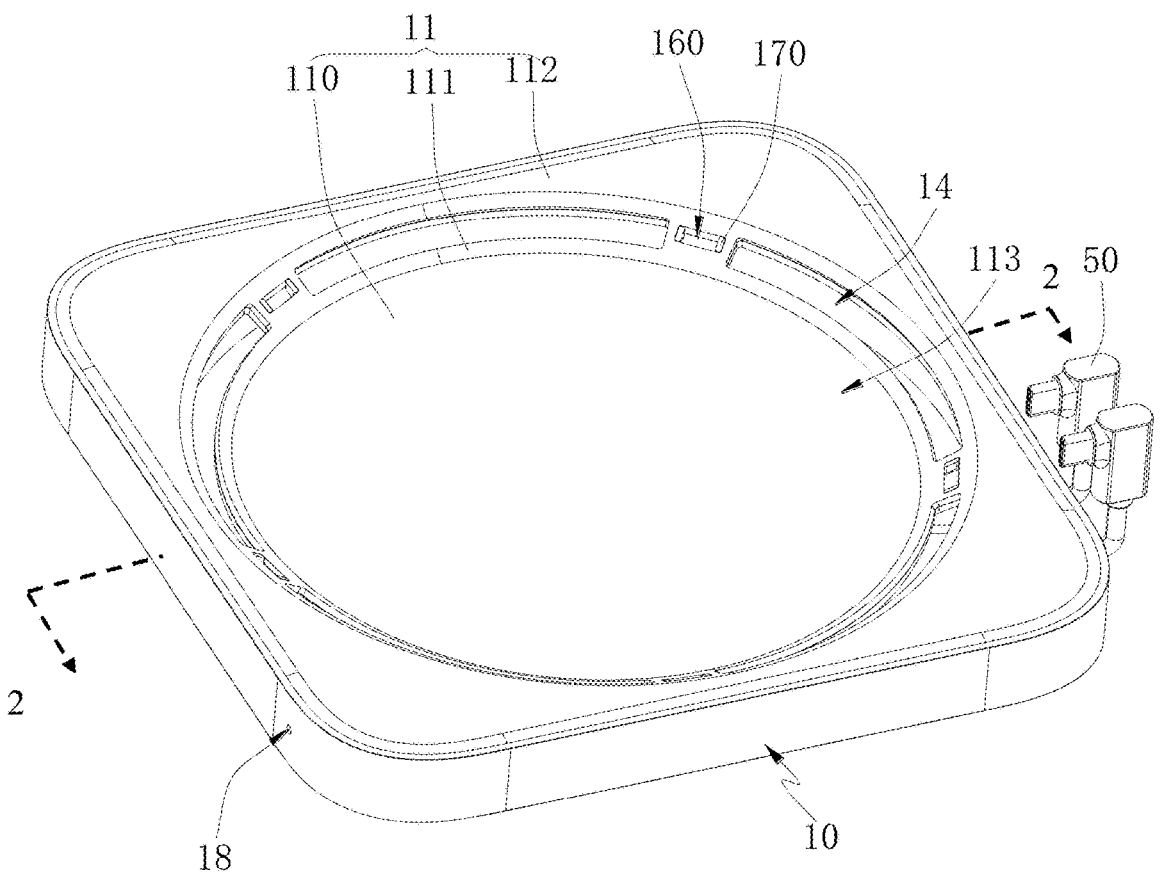
FIG. 1 is a top perspective view of an embodiment of the present memory expansion device.

To clarify the objectives, technical solutions and advantages of the embodiments of the present application, the present application is further described in detail below in combination with the drawings and embodiments. It should be understood that specific embodiments described here are only used to explain the present invention and are not intended to limit the present application.

It should be noted that when a component is referred to as being "fixed on" or "arranged on" another component, it may be directly on the other component or indirectly on the other component. When a component is referred to as being "connected to" another component, it may be directly or indirectly connected to the other component. The orientation or position relationship indicated by the terms "upper", "lower", "left", "right", etc. is based on the orientation or position relationship shown in the drawings, and is only for the convenience of description, and does not indicate or imply that the device or element referred to must have a specific orientation, be constructed and operated in a specific orientation, and therefore cannot be understood as a limitation of the present application. For a person of ordinary skill in the art, the specific meanings of the above terms can be understood according to the specific circumstances. The terms "first" and "second" are used for descriptive purposes only, and cannot be understood as indicating or implying relative importance or implicitly indicating the number of technical features. The phrase "a/the plurality of" means two or more, unless otherwise clearly and specifically defined.

To illustrate the technical solutions provided by the present application, the following is a detailed description in conjunction with specific drawings and embodiments.

Referring to FIGS. 1 to 4 together. Some embodiments of the present application provide a memory expansion device, which is used to expand the memory of a computer host to improve the running speed and fluency of the computer host. Particularly in this embodiment, the computer host is a Mac Sdudio. It can be understood that the memory expansion device of the present application is mainly adapted to the Mac Sdudio, that is, the memory expansion device of the present application is used to expand the memory of the Mac Sdudio. In addition, the memory expansion device may also be used as a dedicated base for the Mac Sdudio to support the Mac Sdudio.

Figure 2:
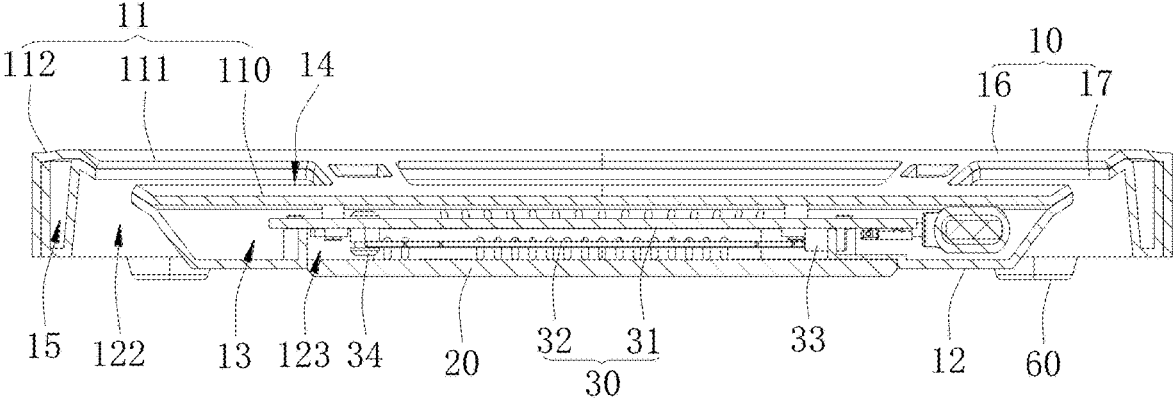
FIG. 2 is a cross-sectional view of the memory expansion device taken along line 2-2 in FIG. 1 in the direction generally indicated.

Specifically, with reference to FIGS. 1 and 2. The memory expansion device includes a shell 10 and a memory expansion component 30. A contact surface 11, a heat dissipation surface 12 and a heat conduction port 14 are disposed on the shell 10. An accommodating cavity 13 is arranged inside the shell 10. The heat conduction port 14 penetrates through the contact surface 11 and the heat dissipation surface 12, and is separated from the accommodating cavity 13. It can be understood that the heat conduction port 14 does not communicate with the accommodating cavity 13. The memory expansion component 30 is arranged within the accommodating cavity 13, and the memory expansion component 30 is configured to store programs and various data.

When in use, the computer host is placed on the contact surface 11 of the shell 10, and some heat dissipation holes on the bottom of the computer host are correspondingly in communication with the heat conduction port 14 on the shell 10, so that the computer host can dissipate heat through the heat conduction port 14. It can be understood that the heat emitted by the computer host through the heat dissipation holes corresponding to the heat conduction port 14 can be dissipated to the side of the shell 10 where the heat dissipation surface 12 is located through the heat conduction port 14, meanwhile, the cold air flow on the side where the heat dissipation surface 12 is located can also flow into the computer host through the heat conduction port 14 and the heat dissipation holes on the computer host corresponding to the heat conduction port 14. The memory expansion component 30 is electrically connected to the computer host to expand the memory of the computer host.

Compared with the existing technologies, the memory expansion device provided by the present application includes a shell 10 and a memory expansion component 30, and the memory expansion component 30 is configured to store programs and various data to expand the memory of the computer host. The heat conducting port 14 penetrates through the contact surface 11 and the heat dissipation surface 12 on the shell 10, some heat dissipation holes on the bottom of the computer host are in communication with the heat conducting port 14 on the shell 10 when the contact surface 11 of the shell 10 is in contact with the outer surface of the computer host, so that the heat on the computer host can be dissipated to the side where the heat dissipation surface 12 is located through the heat conducting port 14, so that the heat on the computer host can be dissipated in time, which is beneficial to ensuring the heat dissipation of the computer host. In addition, the heat conducting port 14 is separated from the accommodating cavity 13, which effectively prevents the heat dissipated by the computer from entering the accommodating cavity 13 through the heat conducting port 14 and damaging the memory expansion component 30.

In another embodiment of the present application, the contact surface 11 includes a middle area 110, a transition area 111 and an edge area 112, the transition area 111 surrounds the periphery of the middle area 110, the edge area 112 surrounds the periphery of the transition area 111, the accommodating cavity 13 is arranged corresponding to the middle area 110, the heat conduction port 14 is arranged corresponding to the transition area 111. A wiring cavity 15 is arranged inside the shell 10, the wiring cavity 15 is arranged corresponding to the edge area 112, and is in communication with the accommodating cavity 13. The wiring cavity 15 is separated from the heat conduction port 14, and the wiring cavity 15 is configured for wiring of the memory expansion component 30.

A wire hole is arranged inside the shell 10 corresponding to the transition area 111, and the wire hole is spaced apart from the heat conduction port 14, that is, the wire hole does communicate with the heat conduction port 14. The wire hole is in communication with the accommodating cavity 13 and the wiring cavity 15, so that the wiring cavity 15 is in communication with the accommodating cavity 13.

Figure 3:
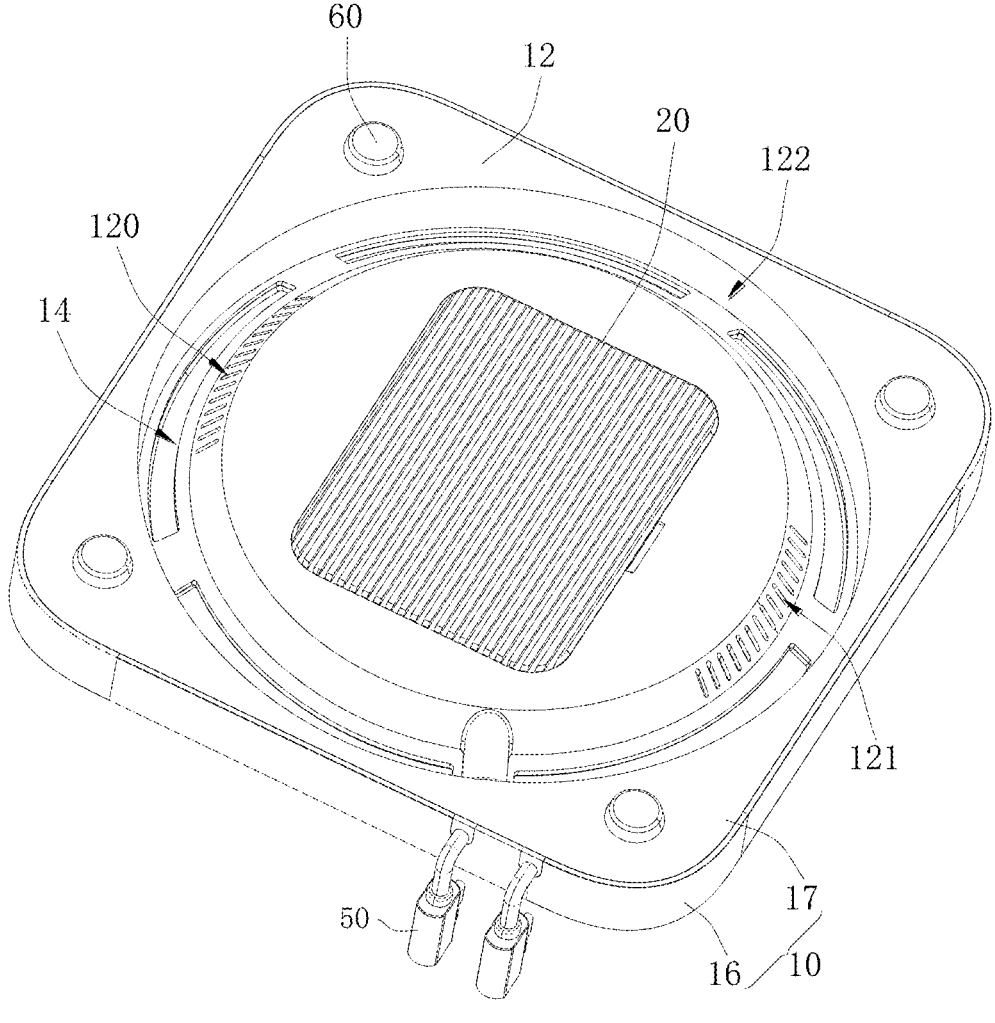
FIG. 3 is a bottom perspective view of the memory expansion device of FIG. 1.

Referring to FIGS. 2 and 3. The middle area 110 is recessed relative to the edge area 112 to form a placement groove 113, so that a bottom portion of the computer host can be placed exactly in the placement groove 113, thereby the computer host is enabled to be more stably placed on the contact surface 11. The transition area 111 is inclined relative to the edge area 112, and the transition area 111 is oriented toward the center of the middle area 110, to enable the transition area 111 to be matched with an inclined part of the bottom portion of the computer host. The heat dissipation holes are disposed on the inclined part of the bottom portion of the computer host, thereby, the transition area 111 matched with the inclined part of the bottom of the computer host enables the heat conduction port 14 to well correspond to the heat dissipation hole on the bottom of the computer host.

It should be noted that the shapes of the middle area 110, the edge area 112 and the transition area 111 are arranged according to a bottom shape of the computer host to be adapted, and are not limited here. Optionally, in this embodiment, the shell 10 is rectangular, that is, the edge area 112 is rectangular, and the middle area 110 and the transition area 111 are both circular. In other embodiments, the shell 10 may also be other polygonal, triangular or elliptical shapes, that is, the edge area 112 may also be other polygonal, triangular or elliptical shapes, and the middle area 110 and the transition area 111 may also be polygonal, triangular or elliptical shapes.

In another embodiment of the present application, multiple heat conduction ports 14 are provided, and the multiple heat conduction ports 14 are distributed at intervals along the circumference of the transition area 111. Optionally, four heat conduction ports 14 are provided, and the four heat conduction ports 14 are distributed at an equal interval along the circumference of the transition area 111.

Optionally, the heat conduction port 14 is in an arc shape and extends along the circumference of the contact surface 11. Specifically, the heat conduction port 14 extends along the circumference of the transition area 111.

In some embodiments, the contact surface 11 and the heat dissipation surface 12 are arranged opposite to each other, that is, the contact surface 11 and the heat dissipation surface 12 are two opposite sides of the shell 10 respectively. It can be understood that the heat dissipation surface 12 is arranged away from the contact surface 11. Optionally, the contact surface 11 is the top surface of the shell 10, and the heat dissipation surface 12 is the bottom surface of the shell 10. In other embodiments, the heat dissipation surface 12 may also be a peripheral side surface of the shell 10, that is, the heat dissipation surface 12 is arranged close to the contact surface 11. Alternatively, the contact surface 11 and the heat dissipation surface 12 are located on the same side of the shell 10, and the heat dissipation surface 12 does not contact the computer host. It can be understood that the heat dissipation surface 12 may be any surface of the shell 10, as long as it is ensured that the heat in the heat conduction port 14 can be dissipated to the outside through the heat dissipation surface 12.

In another embodiment of the present application, a plurality of air inlets 120 and a plurality of air outlets 121 are disposed on the shell 10. The air inlets 120 and the air outlets 121 are all in communication with the accommodating cavity 13, and are located on the side where the heat dissipation surface 12 is located. The air inlets 120 and the air outlets 121 are respectively arranged on two opposite side portions of the shell 10 corresponding to the middle area 110. External air enters the accommodating cavity 13 through the air inlets 120, and then is discharged through the air outlets 121, so that the air inlets 120 and the air outlets 121 form air convection to take away the heat in the accommodating cavity 13, thereby the heat dissipation of the memory expansion component 30 in the accommodating cavity 13 is realized, so that the temperature of the memory expansion component 30 during use is reduced, which avoids damage due to high temperature, and effectively prevents the user from being scalded by excessive heat of the shell 10.

The circumferential area of the heat dissipation surface 12 corresponding to the heat conduction port 14 is recessed toward the contact surface 11 to form a guide groove 122, that is, the guide groove 122 is annular along the circumference of the shell 10. It can be understood that the guide groove 122 is in communication with the heat conduction port 14. The circumferential area of the heat dissipation surface 12 corresponding to the air inlets 120 and the air outlets 121 is inclined toward the guide groove 122. It can be understood that the guide groove 122 is in communication with the air inlets 120 and the air outlets 121. By providing the guide groove 122, it is beneficial to increase the airflow space at the bottom of the shell 10, so that the heat at the heat conduction port 14 can be quickly dissipated through the guide groove 122, and it is also beneficial to improve the convection effect between the air inlet 120 and the air outlet 121.

In some embodiments, an installation port 123 is disposed on the shell 10. The installation port 123 is in communication with the accommodating cavity 13 and is located on the side where the heat dissipation surface 12 is located. An expansion card 32 of the memory expansion component 30 is installed or removed through the installation port 123.

Figure 4:
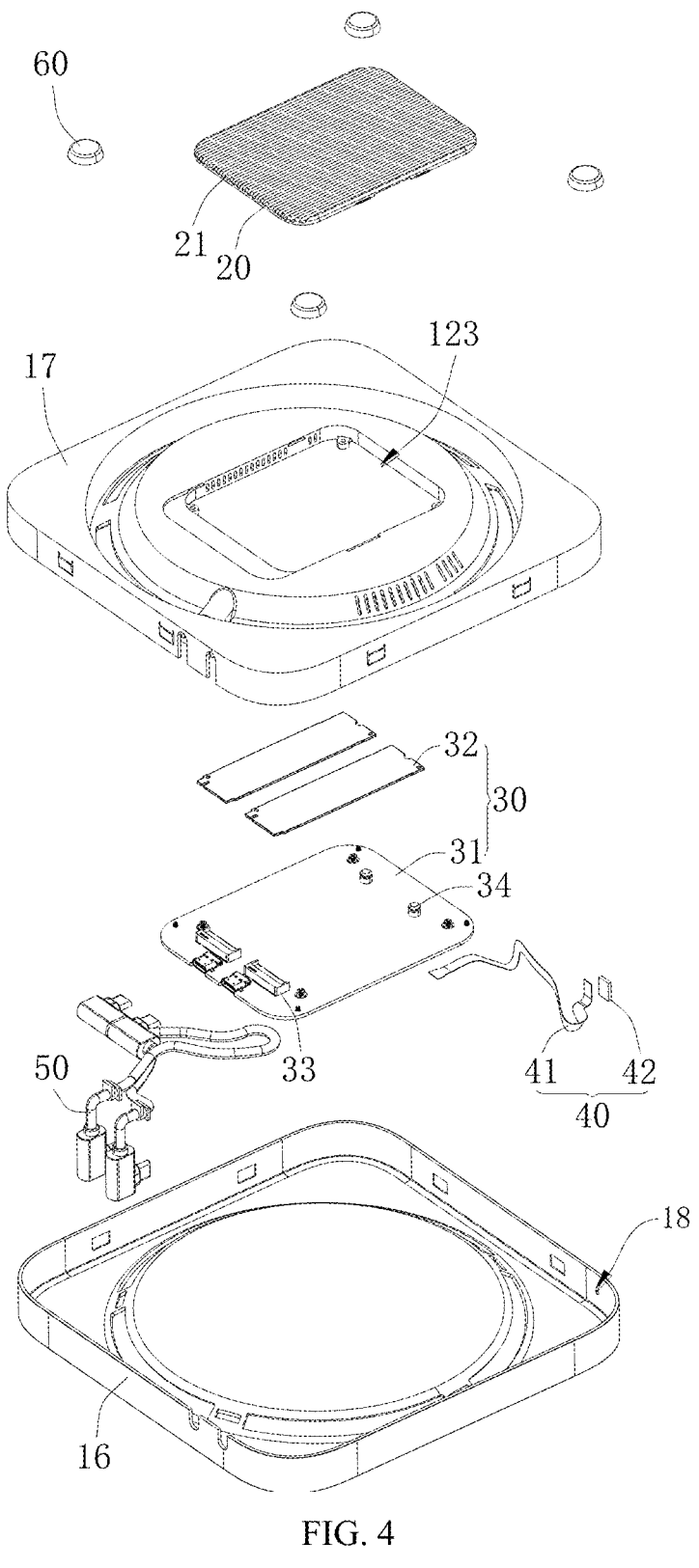
FIG. 4 is an exploded perspective view of the memory expansion device shown in FIG. 3.

In some embodiments, referring to FIG. 1 and FIG. 4. The shell 10 includes a front shell 16 and a bottom shell 17. The bottom shell 17 and the front shell 16 are fit-connected to form the accommodating cavity 13 and the wiring cavity 15. The side of the front shell 16 facing away from the bottom shell 17 is the contact surface 11, and the side of the bottom shell 17 facing away from the front shell 16 is the heat dissipation surface 12. The heat conduction port 14 penetrates through the front shell 16 and the bottom shell 17. The air inlets, the air outlets and the installation port 123 are all disposed on the bottom shell 17.

A slot 160 is disposed on one of the front shell 16 and the bottom shell 17, and a buckle 170 is disposed on the other one of the front shell 16 and the bottom shell 17. The buckle 170 and the slot 160 are both arranged corresponding to the transition area 111, and the buckle 170 is engaged with the slot 160. It can be understood that in some embodiments, the front shell 16 is provided with a slot 160, the bottom shell 17 is provided with a buckle 170, the buckle 170 and the slot 160 are both arranged corresponding to the transition area 111, and the buckle 170 is engaged with the slot 160. In other embodiments, the front shell 16 is provided with a buckle 170, the bottom shell 17 is provided with a slot 160, the buckle 170 and the slot 160 are both arranged corresponding to the transition area 111, and the buckle 170 is engaged with the slot 160.

The front shell 16 is an aluminum shell. It can be understood that the front shell 16 is made of aluminum alloy, which is conducive to the heat dissipation of the memory expansion component 30 and the computer host. The bottom shell 17 is a plastic shell. It can be understood that the bottom shell 17 is made of plastic material. Optionally, the plastic material of the bottom shell 17 may be acrylonitrile-butadiene-styrene plastic (Acrylonitrile Butadiene Styrene plastic, ABS for short).

The memory expansion device also includes a cover plate 20, and the cover plate 20 is detachably covered on the installation port 123. It can be understood that a user, after opening the cover plate 20, can install or remove the expansion card 32 through the installation port 123, which is convenient for the user to replace the expansion card 32.

A plurality of heat dissipation fins 21 are arranged on the side of the cover plate 20 away from the accommodating cavity 13, and the plurality of heat dissipation fins 21 are arranged at intervals. The plurality of heat dissipation fins 21 are arranged on the cover plate 20, which is beneficial to dissipate heat of the memory expansion component 30.

Optionally, the cover plate 20 and the heat dissipation fins 21 are all made of aluminum alloy.

In another embodiment of the present application, refer to FIGS. 2 to 4, the memory expansion device also includes a plurality of anti-skid feet 60, and the plurality of anti-skid feet 60 are arranged at intervals on the heat dissipation surface 12 of the bottom shell 17. The anti-skid feet 60 are arranged corresponding to the edge area 112. Optionally, the number of anti-skid feet 60 is four, and the four anti-skid feet 60 are respectively arranged at the four corners of the bottom shell 17. By arranging the anti-skid feet 60, the height of the bottom of the shell 10 is increased, so that when the memory expansion device is placed on a desktop or the ground, the heat at the heat conduction port 14 can be dissipated to the outside, and the air convection is formed between the air inlet 120 and the air outlet 121.

Referring to FIGS. 2 and 4. The memory expansion component 30 is arranged close to the heat dissipation surface 12. The memory expansion component 30 is arranged close to the bottom shell 17. It can be understood that when in use, the computer host will generate heat and transfer the heat to the contact surface 11, and the memory expansion component 30 will also generate heat. As the memory expansion component 30 is arranged close to the heat dissipation surface 12, that is, the memory expansion component 30 is arranged away from the contact surface 11, the memory expansion component 30 is spaced apart from the computer host, thus the heat cross transfer between the memory expansion component 30 and the computer host is effectively prevented.

Particularly, the memory expansion component 30 includes a circuit board 31 and an expansion card 32. The circuit board 31 is arranged within the accommodating cavity 13 and is disposed close to the heat dissipation surface 12. The expansion card 32 is detachably arranged on the circuit board 31 to realize an electrical connection between the expansion card 32 and the circuit board 31. The expansion card 32 is arranged corresponding to the installation port 123, so that the expansion card 32 can be disassembled and installed by opening the cover plate 20.

The circuit board 31 is clamped between the front shell 16 and the bottom shell 17. Optionally, the front shell 16, the circuit board 31, and the bottom shell 17 are connected in sequence by screws. Optionally, the circuit board 31 is a PCBA, which is the abbreviation of Printed Circuit Board Assembly in English, and is the entire process of a blank PCB board through SMT mounting or DIP plug-in.

The number of expansion cards 32 is two, and the two expansion cards 32 are arranged in parallel and spaced apart. The expansion card 32 may be a conventional M.2 PCIE card on the market.

In some embodiments, a card seat 33 and an elastic limit column 34 are disposed on the circuit board 31, and the card seat 33 and the elastic limit column 34 are arranged opposite to each other and spaced apart, and the expansion card 32 is arranged between the card seat 33 and the elastic limit column 34. The card seat 33 is provided with a limit slot, and one end of the expansion card 32 can be inserted into the limit slot. The elastic limit column 34 is a silica gel particle which is a soft material with good elasticity. The elastic limit column 34 can be deformed to adjust the distance between the elastic limit column 34 and the card seat 33, so that the expansion card 32 can be limited between the card seat 33 and the elastic limit column 34.

In some embodiments, referring to FIG. 4, the memory expansion device also includes an indicator light component 40. The indicator light component 40 is disposed on the shell 10 and electrically connected to the circuit board 31, and the indicator light component 40 is configured to indicate an operating state of the expansion card 32.

It should be noted that a first color light is displayed by the indicator light component 40 when the expansion card 32 is not operating. A second color light is displayed by the indicator light component 40 when the expansion card 32 is not assembled on the circuit board 31. A third color light is displayed by the indicator light component 40 when the expansion card 32 is normally connected and operable. The first color light, the second color light and the third color light are lights of different colors.

Optionally, the first color light is red light, the second color light is yellow light, and the third color light is green light.

Particularly, a light-transmitting hole 18 is disposed on the shell 10, and the light-transmitting hole 18 is provided on a side wall of the shell 10 and is in communication with the wiring cavity 15. The indicator light component 40 includes a flexible printed circuit board 41 (Flexible Printed Circuit board, FPC for short) and a foam 42. One end of the flexible printed circuit board 41 is disposed within the accommodating cavity 13 and is electrically connected to the circuit board 31. The other end of the flexible printed circuit board 41 extends into the wiring cavity 15 through the wire hole and is arranged corresponding to the light-transmitting hole 18. An indicator light is arranged on the end of the flexible printed circuit board 41 corresponding to the light-transmitting hole 18. If the indicator light is red, it is indicated that the expansion card 32 is not operating. If the indicator light is yellow, it is indicated that the expansion card 32 is not assembled. If the indicator light is green, it is indicated that the expansion card 32 is normally connected and operable. Of course, in other embodiments, the first color light, the second color light and the third color light may also be lights of other different colors, which will not limited in here.

The foam 42 is arranged within the wiring cavity 15, and the foam 42 is arranged between the flexible circuit board 41 and the light-transmitting hole 18. The foam 42 is configured to protect the indicator light on the flexible circuit board 41. in addition, the foam 42 also has a semi-shielding effect, which prevents the indicator light from transmitting light from the part outside the light-transmitting hole 18 of the shell 10, which is conducive to ensuring the consistency of the brightness of the appearance of the shell 10.

In some embodiments, referring to FIGS. 1, 3 and 4. The memory expansion device also includes a data transmission line 50, one end of the data transmission line 50 is electrically connected to the memory expansion component 30, and the other end of the data transmission line 50 passes through the outer peripheral side wall of the shell 10 to extend outside the shell 10 and is configured to be electrically connected to the computer host. That is, the memory expansion component 30 is electrically connected to the computer host through the data transmission line 50. Particularly, one end of the data transmission line 50 is located inside the accommodating cavity 13 and is electrically connected to the circuit board 31. The other end of the data transmission line 50 passes through the wire hole, the wiring cavity 15 and the outer peripheral side wall of the shell 10 in sequence and extends outside the shell 10. The memory expansion device is provided with a data transmission line 50, thus, when the memory expansion device is in use, the end of the data transmission line 50 extending out of the shell 10 is plugged into the computer host, so that the memory expansion device is electrically connected to the computer host without the need for additional wiring, which is convenient for users to use.

The number of data transmission lines 50 is two. By providing two data transmission lines 50, a dual-line input is realized, and a double-rate transmission is performed, and thus a high transmission efficiency is achieved, which is conducive to improving user experience.

Optionally, the data transmission line 50 is a Type-c cable.

The foregoing merely mentions some optional embodiments of the present application and are not intended to limit the present application. For a person of ordinary skill in the art, the present application may have various changes and variations. Any modification, equivalent replacement, improvement, etc. made within the spirit and principle of the present application shall all be included in the scope of the claims of the present application.

The invention claimed is:

1. A memory expansion device, comprising:
   a shell, wherein a contact surface, a heat dissipation surface and a heat conduction port are disposed on the shell, and an accommodating cavity is arranged inside the shell, and wherein the heat conduction port penetrates through the contact surface and the heat dissipation surface and is separated from the accommodating cavity; and
   a memory expansion component, wherein the memory expansion component is arranged within the accommodating cavity.

2. The memory expansion device according to claim 1, wherein the contact surface is arranged opposite to the heat dissipation surface, and a plurality of air inlets and a plurality of air outlets are further disposed on the shell, wherein the plurality of air inlets and the plurality of air outlets are all in communication with the accommodating cavity and are located on a side where the heat dissipation surface is located.

3. The memory expansion device according to claim 2, wherein a circumferential area of the heat dissipation surface corresponding to the heat conduction port is recessed toward the contact surface to form a guide groove, and a circumferential area of the heat dissipation surface corresponding to the plurality of air inlets and the plurality of air outlets is inclined toward the guide groove.

4. The memory expansion device according to claim 2, characterized by further comprising a plurality of anti-skid feet, wherein the plurality of anti-skid feet are arranged at intervals on the heat dissipation surface.

5. The memory expansion device according to claim 2, wherein the contact surface comprises a middle area, a transition area and an edge area, the transition area is arranged surrounding a periphery of the middle area, the edge area is arranged surrounding a periphery of the transition area, the accommodating cavity is arranged corresponding to the middle area, the heat conduction port is arranged corresponding to the transition area, and a wiring cavity is arranged inside the shell, the wiring cavity is arranged corresponding to the edge area and is in communication with the accommodating cavity.

6. The memory expansion device according to claim 5, wherein the middle area is recessed relative to the edge area to form a placement groove.

7. The memory expansion device according to claim 5, wherein the transition area is inclined relative to the edge area, and the transition area is oriented toward a center of the middle area.

8. The memory expansion device according to claim 5, wherein the shell comprises a front shell and a bottom shell, the bottom shell and the front shell are fit-connected to form the accommodating cavity and the wiring cavity, a side of the front shell facing away from the bottom shell is the contact surface, a side of the bottom shell facing away from the front shell is the heat dissipation surface, and the heat conduction port penetrates through the front shell and the bottom shell.

9. The memory expansion device according to claim 8, wherein a slot is disposed on one of the front shell and the bottom shell, and a buckle is disposed on the other one of the front shell and the bottom shell, the buckle and the slot are both arranged corresponding to the transition area, and the buckle is engaged with the slot.

10. The memory expansion device according to claim 8, wherein the front shell is an aluminum shell, and the bottom shell is a plastic shell.

11. The memory expansion device according to claim 1, wherein the memory expansion component is arranged close to the heat dissipation surface.

12. The memory expansion device according to claim 1, wherein the memory expansion component comprises a circuit board and an expansion card, and the expansion card is detachably arranged on the circuit board.

13. The memory expansion device according to claim 12, wherein a card seat and an elastic limit column are disposed on the circuit board, the card seat and the elastic limit column are arranged opposite to each other and spaced apart, and the expansion card is arranged between the card seat and the elastic limit column.

14. The memory expansion device according to claim 13, wherein the elastic limit column is a silica gel particle.

15. The memory expansion device according to claim 12, wherein an installation port is disposed on the shell in communication with the accommodating cavity, and the installation port is located on the side where the heat dissipation surface is located; the memory expansion device further comprises a cover plate covering the installation port; and the expansion card is arranged corresponding to the installation port.

16. The memory expansion device according to claim 15, wherein a plurality of heat dissipation fins are arranged on a side of the cover plate away from the accommodating cavity.

17. The memory expansion device according to claim 12, further comprising an indicator light component, the indicator light component is disposed on the shell and electrically connected to the circuit board, and is configured to indicate an operating state of the expansion card.

18. The memory expansion device according to claim 17, wherein a first color light is displayed by the indicator light component when the expansion card is not operating; a second color light is displayed by the indicator light component when the expansion card is not assembled on the circuit board; and a third color light is displayed by the indicator light component when the expansion card is normally connected and operable, and wherein the first color light, the second color light and the third color light are lights of different colors respectively.

19. The memory expansion device according to claim 1, further comprising a data transmission line, one end of the data transmission line is electrically connected to the memory expansion component, and another end of the data transmission line is arranged passing through an outer peripheral side wall of the shell and extending out of the shell.

20. The memory expansion device according to claim 19, wherein two data transmission lines are provided, and the two data transmission lines are arranged in parallel.

* * * * *